United States Patent [19]

Sonoda et al.

[11] Patent Number: 4,486,692
[45] Date of Patent: Dec. 4, 1984

[54] DC MOTOR CONTROL CIRCUIT FOR DROP-OUT OF STOPPING PULSES IN RECORDER

[75] Inventors: Masakazu Sonoda; Takashi Terashima, both of Urawa; Minoru Ozawa, Kokubunji, all of Japan

[73] Assignee: Sony Corporation, Tokyo, Japan

[21] Appl. No.: 422,711

[22] Filed: Sep. 24, 1982

[30] Foreign Application Priority Data

Sep. 25, 1981 [JP] Japan .................. 56-151635

[51] Int. Cl.³ ............................. H02P 3/10
[52] U.S. Cl. ...................... 318/258; 318/306; 318/327; 318/763; 358/314
[58] Field of Search ............. 318/606, 607, 318, 257, 318/258, 269, 327, 6; 360/78, 74.4; 358/314

[56] References Cited

U.S. PATENT DOCUMENTS

| | | | |
|---|---|---|---|
| 3,958,271 | 5/1976 | Sumiyoshi | 318/314 X |
| 4,086,520 | 4/1978 | Hashizaki et al. | 318/269 |
| 4,212,039 | 7/1980 | Koda | 360/70 X |
| 4,254,367 | 3/1981 | Sakamoto | 318/318 X |
| 4,276,571 | 6/1981 | Sakamoto | 318/808 X |
| 4,303,953 | 12/1981 | Sanderson | 360/78 |

FOREIGN PATENT DOCUMENTS 2096801 10/1982 United Kingdom ............. 360/78

*Primary Examiner*—J. V. Truhe
*Assistant Examiner*—Bentsu Ro
*Attorney, Agent, or Firm*—Lewis H. Eslinger; Alvin Sinderbrand

[57] ABSTRACT

A control circuit for a DC capstan motor used for driving a tape having control signals thereon is adapted for accurate stopping of the tape during intermittent-motion operation. A frequency generator coupled to the motor generates a frequency signal whose frequency is proportional to the motor's speed. A position signal generating circuit generates a position value that increments by steps upon occurrences of the frequency signal. A clamp circuit clamps the position value to a clamping level upon detection of the control signals. A brake start signal generator provides a brake start pulse signal when the position value exceeds a predetermined threshold, and this brake start pulse signal is used to commence braking of the motor. In order to permit accurate stopping in both forward and reverse directions, the clamping circuit provides one clamping level when a forward mode is selected and another clamping level when a reverse mode is selected.

20 Claims, 37 Drawing Figures

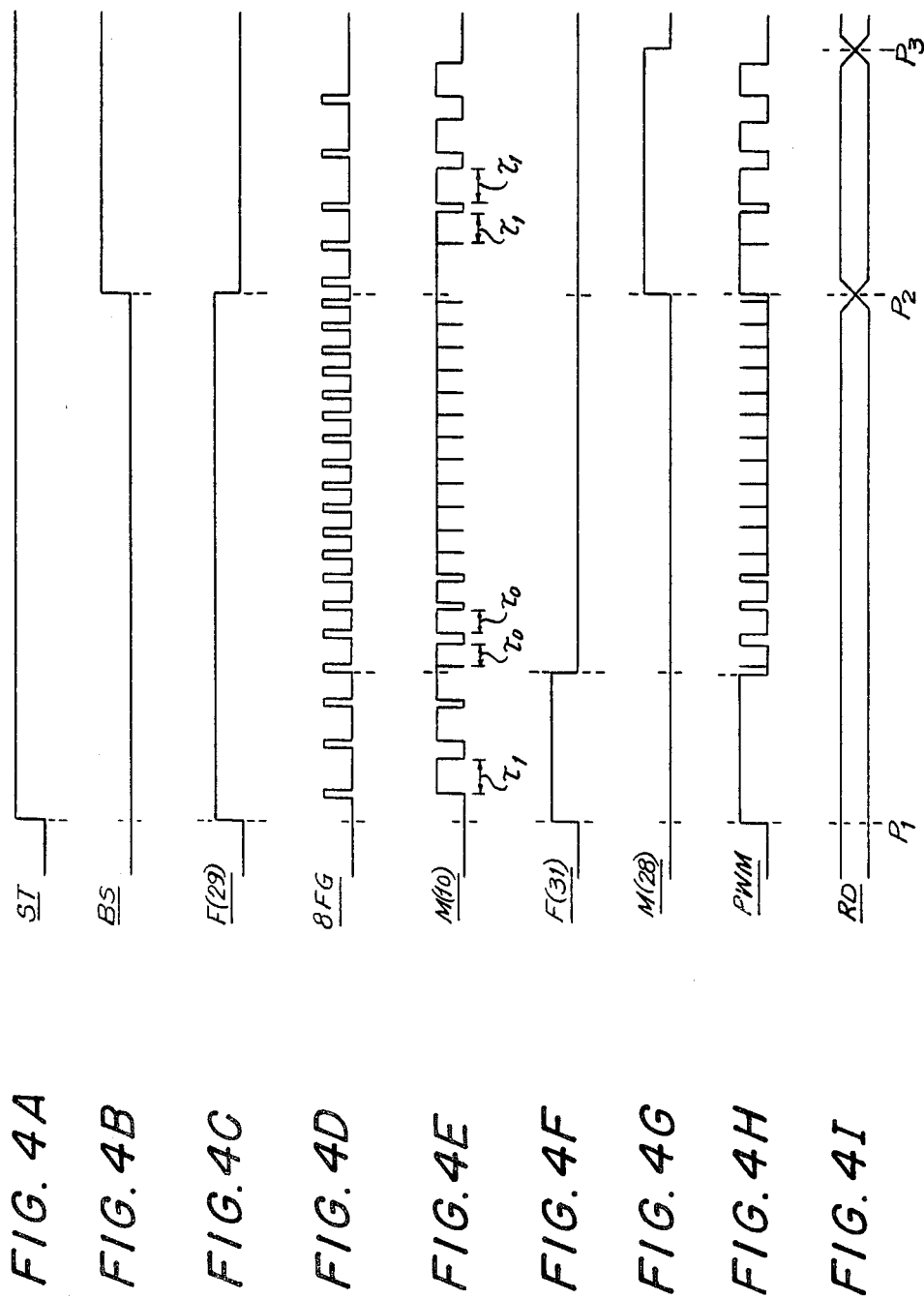

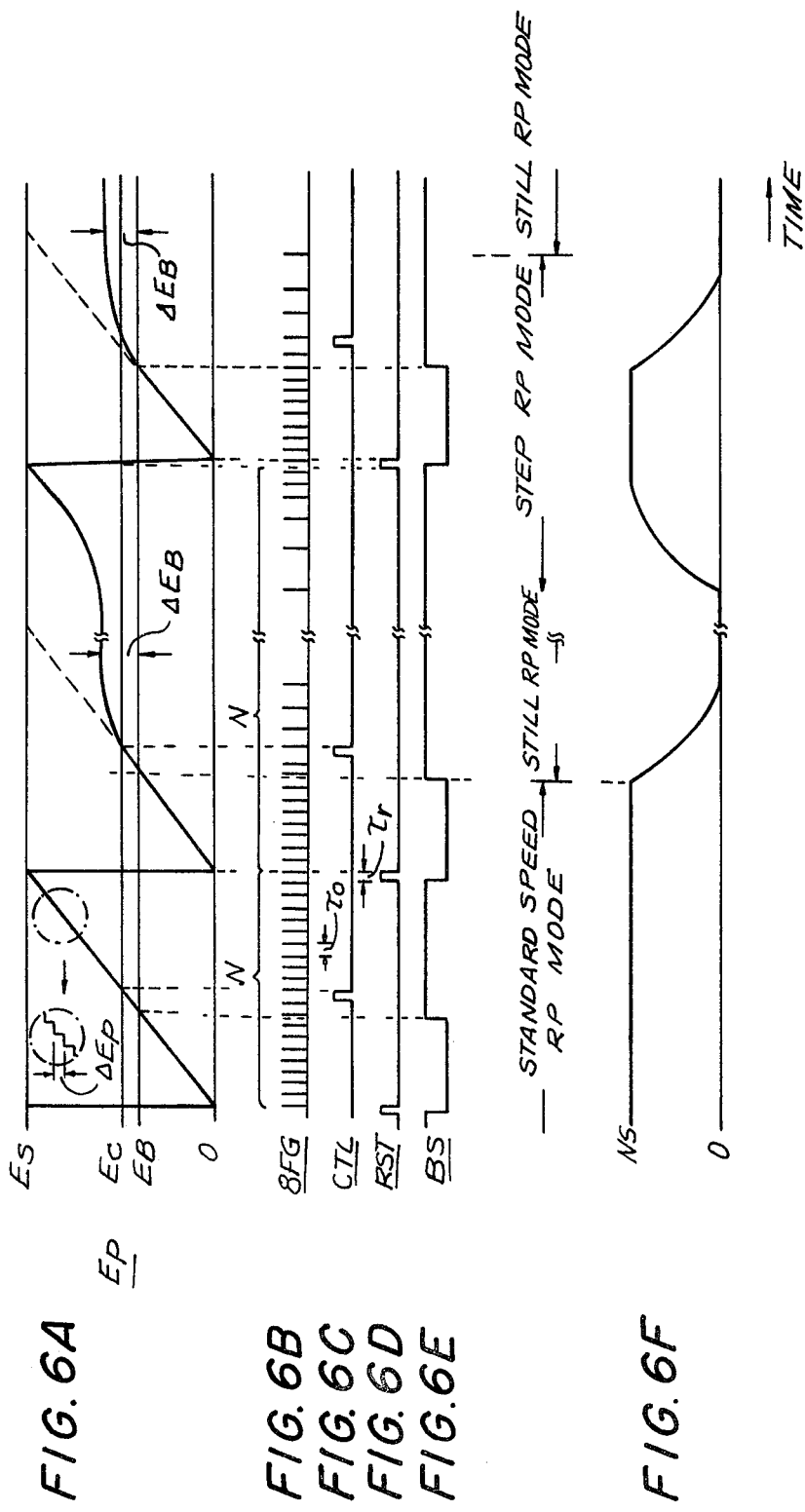

FIG.7
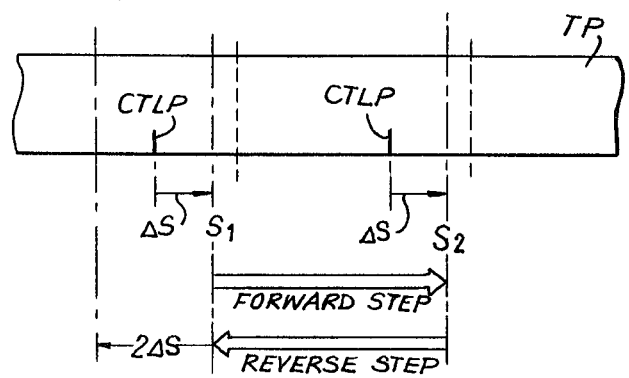
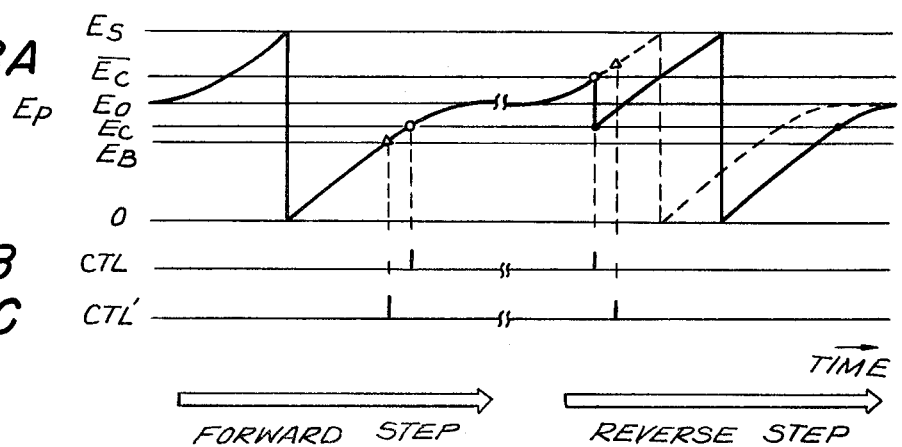
FIG.8A
FIG.8B
FIG.8C

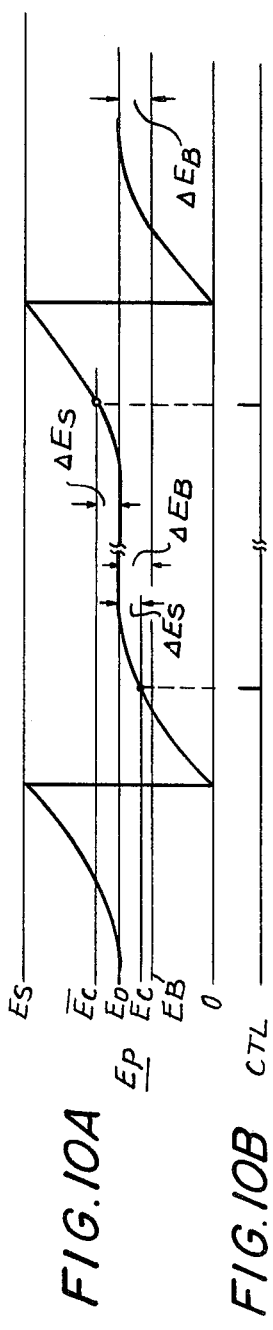
FIG.10A
FIG.10B
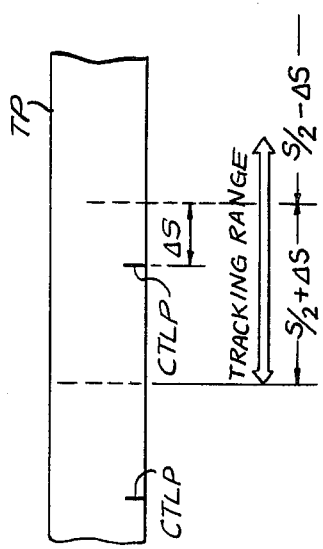
FIG.12
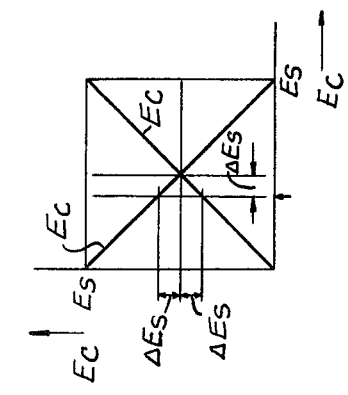
FIG.11

CLICK POINT

DC MOTOR CONTROL CIRCUIT FOR DROP-OUT OF STOPPING PULSES IN RECORDER

BACKGROUND OF THE INVENTION

This invention relates to control circuitry for DC motors, and is more particularly directed to a control circuit for a capstan motor of a tape recording and/or reproducing device, especially a control circuit of a type adapted to control the motor so that the latter drives the tape intermittently in either a forward or a reverse direction.

In video recorders, particularly video tape devices in which fields of video information are recorded on successive slant tracks on the tape, it is often useful to drive the tape intermittently so that different slant tracks can be repeatedly scanned, such as in slow-motion or still-frame reproduction. This is particularly useful, for example, when editing a video program recorded on tape.

On video tape, control signals are typically recorded in a longitudinal control track along an edge of the tape to indicate the position of respective associated slant tracks. That is, the control signals are situated in predetermined locations on the tape relative to the location of the slant tracks. Accordingly, the control signals, which are detected by a stationary control head as the tape is drawn past it, can be used to control stopping of the capstan during intermittent operation and to stop the tape at the location of a desired slant track. This ensures that the trace of a rotary head, carried on a rotating head wheel or drum for picking up the video signal, coincides accurately with the desired slant track. It is preferred that this be true for intermittent operation in both the forward and the reverse direction of transport of the tape.

A conventional capstan motor control circuit generates a drive pulse to effect intermittent motion of the capstan motor. This drive pulse commences (rises to high level) at the time a start signal is received and then ceases (drops to low level) at a later time estimated to correspond with the advancement of the tape by one slant track. A braking pulse occurs when the control signal for a desired track is detected, and is used to halt rotation of the capstan motor. This pulse has a width calculated to be sufficient to stop the motor, but short enough not to cause reverse rotation thereof.

This conventional control circuit has not been capable of accurately halting the tape at the positions of the recorded slant video tracks. For example, if there is drop out in the reproduced control signal, the tape cannot be stopped until the next control signal is picked up. This can result in mistracking. Further, because the brake pulse cannot be generated until the control signal has been picked up, if the desired stopping position is near the position of the recorded control signal on the tape, the tape drive mechanism will advance the tape beyond the desired position before the tape can be stopped, which also can result in mistracking.

OBJECTS AND SUMMARY OF THE INVENTION

Accordingly, it is an object of this invention to provide a control circuit for a DC motor avoiding the drawbacks of the prior art.

It is another object of this invention to provide a control circuit for a DC motor permitting accurate stopping of the motor at a desired location notwithstanding drop out or other defects in the control signal recorded on the tape.

It is a more specific object of this invention to provide a control circuit for a DC capstan motor which is to be operated intermittently to advance video tape, ensuring that the tape is accurately halted at positions in which video signals recorded in slant tracks thereon can be reproduced.

According to an aspect of this invention, a control circuit for a DC capstan motor for driving a tape in a tape device, such as a video tape recorder (VTR), video tape player, or video tape editing arrangement, supplies drive current to the motor so as to drive the tape intermittently. In this control circuit a frequency signal generator associated with the capstan motor generates a frequency signal with a frequency that varies with rotational speed of the motor, for example, by a factor of 720 times the rotary frequency of the motor. A drive pulse generator circuit generates a drive pulse signal when it is desired to commence driving of the tape. A brake pulse generator circuit generates a brake pulse signal when it is desired to stop the driving of the tape. A drive circuit supplied with the frequency signal, the drive pulse signal, and the brake pulse signal provides a drive signal, for example, a pulse-width modulated (PWM) signal whose duty cycle changes with the frequency of the frequency signal. A control signal pickup head picks up control signals recorded at predetermined locations on the tape as the tape is drawn past it. A motor controller circuit supplied with the drive signal supplies drive current to the motor.

A brake start signal circuit includes a position signal generating circuit supplied with the frequency signal for generating a position value that varies incrementally with occurrences of the frequency signal to indicate the position of the tape relative to the predetermined positions of the control signals. A clamp circuit clamps the position value to a predetermined clamp value upon detection of the control signals. A brake start signal generator, favorably formed of a comparator, generates the brake start signal when the position value reaches a predetermined value so that the tape is halted at the correct position corresponding, for example, to a previously recorded video track.

In order to provide accurate stopping of the tape in either reverse or forward tape drive modes, one clamp value is used in the forward mode and a different clamp value is used in the reverse mode.

The above and other objects, features, and advantages of this invention will become more fully apparent from the ensuing description of a preferred embodiment, when considered in connection with the accompanying drawings.

BRIEF DESCRIPTION OF THE DRAWINGS

FIGS. 4A to 4I are waveform diagrams for explaining the operation of the improved control circuit of FIG. 3.

FIGS. 6A to 6F are waveform charts for explaining the operation of the embodiment of FIG. 5.

FIG. 7 shows a magnetic recording tape illustrating relative locations of control signals and desired stopping positions.

FIGS. 8A to 8C are waveform charts illustrating control of movement of tape in forward and reverse modes.

FIGS. 10A and 10B are waveform charts used in explaining the operation of the embodiment of FIG. 9.

FIG. 11 is a chart showing the tracking range of the embodiment of FIG. 9.

FIG. 12 shows a magnetic recording tape and is used to illustrate the tracking range of the embodiment of FIG. 11.

DETAILED DESCRIPTION OF THE PREFERRED EMBODIMENTS

Figure 1:
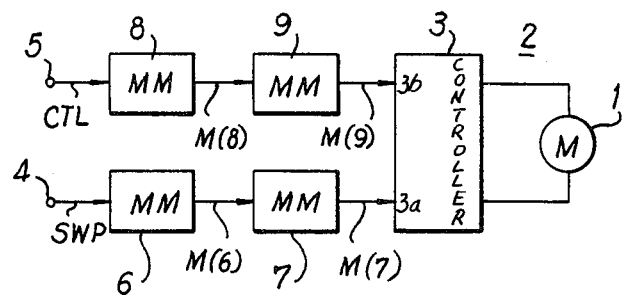
FIG. 1 is a schematic view of a DC motor control circuit according to the prior art.

With reference to the drawings, and initially to FIGS. 1 and 2A–2F thereof, a prior-art control circuit will be described to help explain the advantages of this invention.

As mentioned earlier, in order to permit a video tape recording and/or reproducing device to be operated in a non-standard speed mode, such as stop motion or slow motion, an intermittent-speed control circuit is employed to drive the device's capstan motor intermittently. For example if slow speed reproduction is desired, the capstan should advance the tape repeatedly, by alternately running and stopping the tape. Because the recorded tracks of video information on the tape will correspond to the positions of control signals recorded on the edge of the tape, the intermittent-speed control circuit can be operated under control of detected control signals to cause the capstan to run the tape at standard speed for one pitch of the control signal.

While not specifically shown in the drawings, a video tape recorder (VTR) can have a pair of rotary magnetic heads $H_a$ and $H_b$, disposed 180 degrees apart for alternately scanning successive tracks on the tape when the tape is played at normal speed. These heads $H_a$ and $H_b$ can be provided with different azimuth angles. A supplementary rotary magnetic head $H_a'$, which has the same azimuth angle as the head $H_a$, is angularly displaced from the magnetic head $H_b$ by an angular distance corresponding to 1.25 H, where H is the period of a horizontal scanning interval. If a single track is repeatedly scanned, the magnetic heads $H_a$ and $H_a'$ are used. However, for slow-speed operation, for example at 1/N of standard speed (where N is an integer), a single field on the magnetic tape can be reproduced for (N−1) frames with the tape held stationary, after which the next two fields or tracks are reproduced by using the magnetic heads $H_a$ and $H_b$ for one frame period while the tape is moved at standard speed. By carrying out the above steps repeatedly, the video signal recorded on the tape is reproduced at the speed of 1/N of standard speed.

Figure 2A:
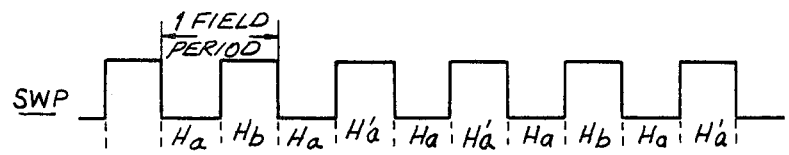
FIGS. 2A to 2F are waveform charts for explaining the operation of the control circuit of FIG. 1.
Figure 2B:
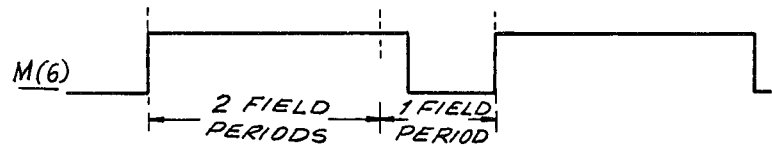
Figure 2C:

FIG. 1 shows a control circuit for driving the tape capstan of the VTR to advance the magnetic tape intermittently as described above. In this circuit, a DC motor 1 is coupled to the tape capstan (not shown) for direct drive of the latter. A drive control circuit 2 is coupled to the motor 1 for intermittent advancing of the tape. A motor controller circuit 3 of drive circuit 2 has outputs coupled to drive the motor 1, and inputs 3a and 3b to receive signals for controlling the driving and rotation direction of the motor 1, respectively. A switch pulse input 4 receives a head change-over signal or switching pulse SWP (FIG. 2A) which rises when the reproducing device is switched over from magnetic head $H_a$ to one of the other heads $H_a'$ or $H_b$, and which falls at the time that the device switches back to the magnetic head $H_a$. A control pulse input 5 is coupled to receive control pulses CTL which are picked up from the control track of the magnetic tape. A monostable multivibrator 6 is triggered at the falling of the change-over signal SWP and provides an output signal M(6) (FIG. 2B). The time constant of this monostable multivibrator 6 can be varied in accordance with the desired tape speed to correspond with the above-mentioned integer N. In this example, since N=3, the time constant is determined so that the width of the output pulse M(6) is greater than two frame periods, but no more than three frame periods.

This pulse M(6) is applied to another monostable multivibrator 7, which, in turn provides a drive pulse M(7) (FIG. 2C) to the terminal 3a of the controller 3. This pulse M(7) rises at the leading edge of the pulse M(6) and has a pulse width $T_f$. This pulse M(7) causes the controller 3 to apply a DC voltage to the motor 1 to cause it to advance the tape in the forward direction. The pulse width $T_f$ here is determined to be not greater than one frame period.

Figure 2D:
Figure 2E:
Figure 2F:

The control pulse CTL, which is shown in FIG. 2D, is picked up by a stationary control head (not shown) from the control track on the tape, and is applied as a trigger to another monostable multivibrator 8, which then provides an output trigger pulse M(8) (FIG. 2E). This pulse M(8) has a duration $\tau$ which can be adjusted, for example, by adjusting the setting of a tracking potentiometer (not shown) to achieve accurate tracking during intermittent operation. This pulse M(8) is applied to a further monostable multivibrator 9, which in turn provides an output braking pulse M(9) (FIG. 2F). This pulse M(9) rises at the time that the pulse M(8) falls, and has a duration $T_r$. This braking pulse M(9) is applied to the terminal 3b of the controller 3 so that current is caused to flow in a reverse direction through the motor 1. This pulse duration $T_r$ is selected to be long enough to cause the current to brake the capstan motor 1, so that tape comes to a complete stop, but not so long that the motor 1 would begin to rotate in the reverse direction.

If it is intended to run the capstan motor 1 at a variety of running speeds, the multivibrators 7 and 9 can be provided with a plurality of predetermined settings, and the durations $T_f$ and $T_r$ of the pulses M(7) and M(9) can be changed to correspond with each of the various running speeds.

With the prior-art control circuit described hereinabove, because the running speed and the stopping of the tape are carried out by supplying pulses of constant duration to the DC motor 1, the stopping position of the tape cannot be accurately determined. This disadvantage is further complicated if the control signals are imperfectly reproduced. If the control signals CTL are not detected, for example due to drop out, the signal M(8) will not be produced, and the tape will continue to run until such time as a control signal CTL is detected. Furthermore, if the position of the track to be scanned is close to the position of the recorded control signals CTL, the control signal may be detected too late for the multivibrators 8 and 9 to act to halt the tape accurately. These problems can result in track mismatch, jitter, and other degradation of the reproduced picture.

The foregoing problem can be avoided by employing an improved control circuit to generate brake start signals to commence braking of the DC motor 1.

Figure 3A:
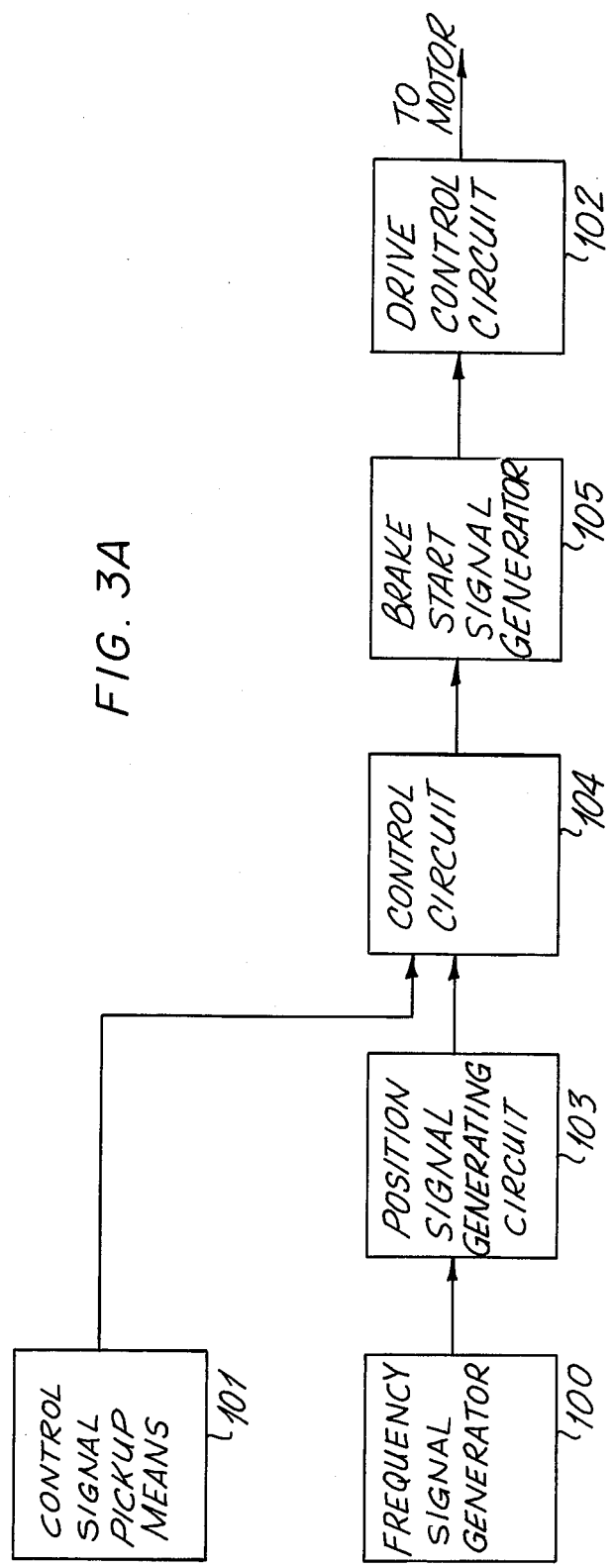
FIG. 3A is a block diagram illustrating certain novel inventive features of the present invention.

FIG. 3A is a block diagram which illustrates novel inventive features of the present invention. A frequency signal generator 100 assocted with the DC motor generates a frequency signal having a frequency that varies with the angular speed of the motor. A control signal pick-up means 101 reproduces control signals from the web, and a drive control circuit 102 coupled to the DC motor is adapted to halt the DC motor at a position corresponding to a predetermined position of the web in response to a brake start signal applied thereto. This brake start signal, as shown in FIG. 2A, is generated by the novel elements comprising a position signal generating circuit 103 which is supplied with the frequency signal and which generates a position value that varies step by step with the occurrences of the frequency signal to indicate the position of the web relative to the predetermined positions. A control circuit 104, which is advantageously a clamping circuit, adjusts this position value in response to and upon detection of the control signals. A brake start signal generator 105 generates the brake start signal in response to the adjusted position value whenever this position value reaches a predetermined threshold value. It will be understood that these functional blocks are fully defined in the embodiments of the circuitry discussed below, in which the circuit elements are assigned individual indentifying numerals. Therefore, for a complete understanding of the present invention and the novel apparatus embodying the inventive concepts, reference should be made to the subsequent drawings and descriptions relating thereto.

Figure 3:
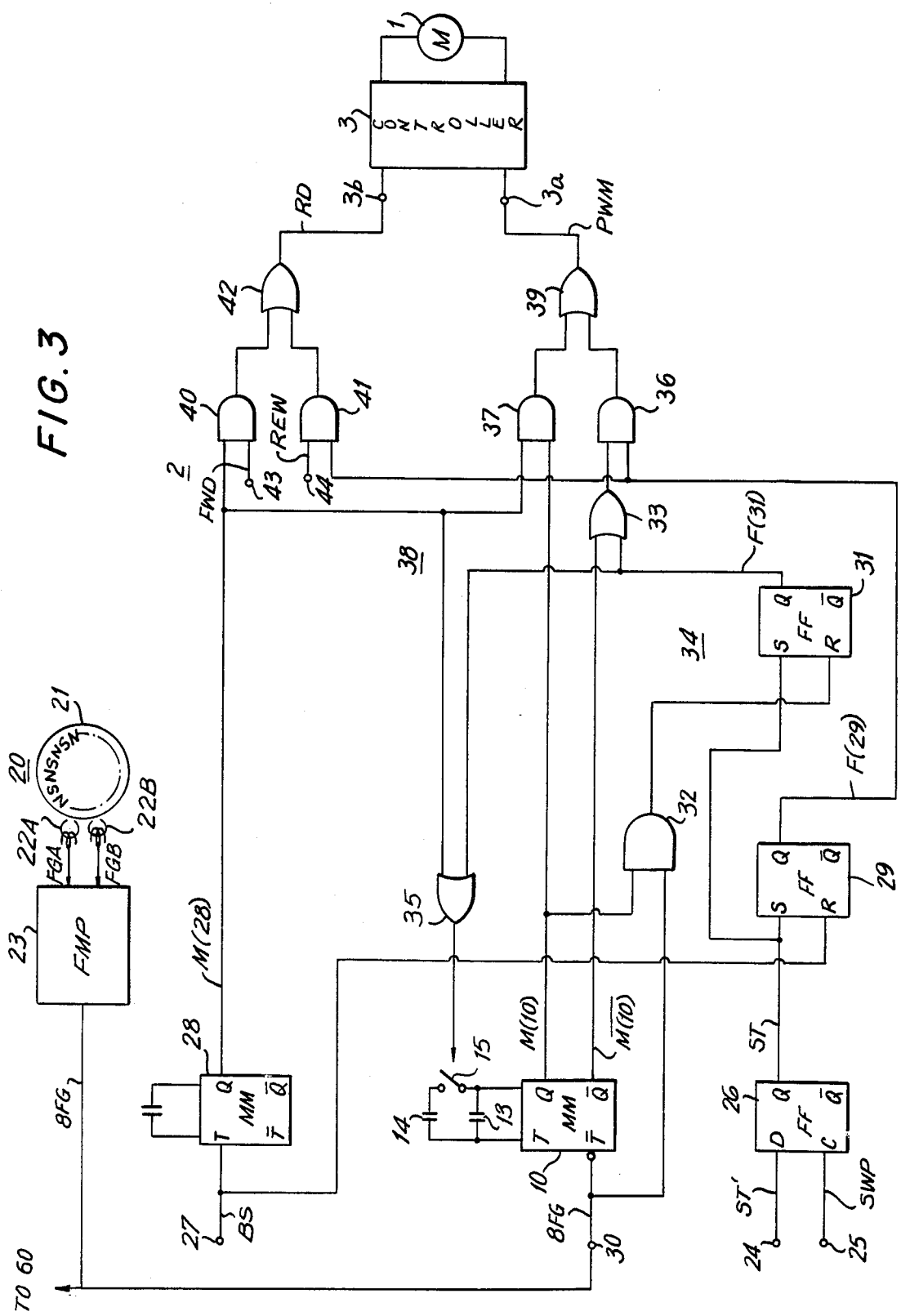
FIG. 3 is a schematic circuit diagram of an improved control circuit used in connection with a preferred embodiment of this invention.

FIG. 3 illustrates an improved control circuit in connection with which embodiments of circuits according to this invention for generating brake start signals can be employed.

This control circuit is explained in greater detail in our copending patent application (Ser. No. 06/422,566, filed Sept. 24, 1982, and assigned in common with the present application). This control circuit employs a retrigger monostable multivibrator 10 to provide a pulse-width modulated (PWM) signal to the controller 3 to control the speed of the DC capstan motor 1 during intermittent operation. In this circuit, the DC motor 1 is direct-coupled to a capstan in a VTR in the same fashion as the motor 1 of FIG. 1. Here, the rotational speed of the capstan can be, for example, 2 Hz at standard-speed running.

During slow-speed reproduction, the capstan is driven in step fashion by the motor 1. The monostable multivibrator 10 has first and second timing capacitors 13 and 14 and a switch 15 for coupling the capacitor 14 to the multivibrator 10. When the switch is open, the monostable multivibrator 10 has a time constant $\tau_0$, but when the switch is closed, it has a longer time constant $\tau_1$. Preferably, these constants are selected so that $\tau_1 \mp 1.5\ \tau_0$.

In this control circuit, a frequency generator 20 comprises a magnetic plate 21 having ninety pairs of magnetic north and south poles N, S disposed alternately thereon. This plate 21 rotates with the capstan motor 1. A pair of magnetic-flux-responsive stationary magnetic heads 22A and 22B, which can be magnetoresistive elements, hall elements, or other equivalent devices, are disposed in proximity to the plate 21 to generate sinusoidal signals FGA and FGB, respectively, which differ in phase from one another by ninety degrees. In other words, if it is assumed that the distance between these two heads is $L_H$, and the pitch between successive magnetic poles N and S is $L_M$, then the distance between heads $L_H$ can be expressed as $$L_H = (n + \tfrac{1}{4})L_M, (n = 0, 1, 2, \ldots ).$$

These signals FGA and FGB are supplied to a frequency multiplier circuit 23, which generates a frequency signal 8FG at a pulse rate eight times the frequency of either signal FGA or FGB. This signal 8FG is applied to the switch 15 for coupling the capacitor 14 to the multivibrator 10 so that the latter has the time constant $\tau_0$ when the switch 15 is open. When the switch is closed, the multivibrator 10 has the longer time constant $\tau_1$.

Here, a start signal input 24 and a switch pulse input 25 are provided to receive, respectively, an external start pulse ST' and the head change-over signal SWP. These signals are respectively applied to data and clock terminals of a flip-flop 26 which provides a synchronized start signal ST (FIG. 4A) commencing at a point in time $P_1$, and which is furnished from an uninverted output terminal Q thereof.

A brake signal input 27 receives a brake start signal BS (FIG. 4B) and is coupled to a trigger input of a monostable multivibrator 28. Another flip-flop 29 has a set terminal coupled to receive the start signal ST and a reset terminal coupled to receive the brake start signal BS, thereby providing an output signal F(29) (FIG. 4C). A trigger input 30 receives the frequency signal 8FG (FIG. 4D) and applies the same to the retrigger monostable multivibrator 10. This retrigger monostable multivibrator 10 provides a pulse signal M(10) (FIG. 4E) from its uninverted output terminal Q, and an inverted version thereof $\overline{M(10)}$ from its inverted output terminal $\overline{Q}$.

Another flip-flop 31 has a set terminal thereof coupled to receive the start signal ST. An AND gate 32 has inputs coupled to receive the signal M(10) and the frequency signal 8FG, and an output terminal coupled to a reset terminal of the flip-flop 31. Thus, the flip-flop 31 provides from its uninverted output terminal Q an output signal F(31) (FIG. 4F), which rises in response to the start signal ST and falls when the pulses of the signal M(10) overlap the pulses of the frequency signal 8FG. In other words, the signal F(31) is high from the onset of the start signal ST only until the pulse duration $\tau_1$ of the signal M(10) equals or exceeds the period of the frequency signal 8FG, that is, only until the angular speed of the DC capstan motor 1 reaches a predetermined speed. The inverted signal $\overline{M(10)}$ and the signal F(31) are each applied to inputs of an OR gate 33.

It should be appreciated that the retrigger monostable multivibrator 10, the AND gate 32, and the flip-flop 31 form a first control loop 34 to control the opening and closing of the switch 15 associated with the multivibrator 10. The signal F(31) is furnished through an OR gate (35) to the switch 15 to change the pulse duration of the signal M(10) from $\tau_1$ to $\tau_0$ after an initial start up period.

The signals F(31) and $\overline{M(10)}$ are supplied from an output of the OR gate 33 to one input of an AND gate 36, another input of which is coupled to receive the signal F(29) from the flip-flop 29. Another AND gate 37 has one input coupled to receive the signal M(10) and another input coupled to an output terminal of the monostable multivibrator 28. The output of this monostable multivibrator 28 is also provided to another input terminal of the OR gate 35. The monostable multivibrator 28 provides a braking signal M(28) (FIG. 4G) for a predetermined period following onset of the brake start signal BS.

It should be appreciated that the monostable multivibrator 28 and the OR gate 35 combine to form a second control loop circuit 38 to close the switch 15 to change the pulse duration of the signal M(10) to $\tau_1$ during braking.

The outputs of the AND gates 36 and 37 are coupled to respective inputs of an OR gate 39, whose output provides the pulse width modulated signal PWM (FIG. 4H) which is applied to the input terminal 3a of the controller 3. The signal M(28) is also applied to one input of an AND gate 40, while the signal F(29) is applied to one input of another AND gate 41. These AND gates 40 and 41 have outputs coupled to inputs of and OR gate 42, whose output is connected to the input terminal 3b of the controller 3. Direction control inputs 43 and 44 connected to other inputs of the AND gates 40 and 41, respectively, receive forward and reverse direction control signals FWD and REV. These signals FWD and REV are respectively high and low when a forward drive mode is selected for the VTR, and are respectively low and high when a reverse drive mode is selected. Consequently, the OR gate 42 provides a rotational direction signal RD (FIG. 4I) which, in a forward mode, goes from high to low at a point $P_2$ corresponding to the onset of the brake start signal BS, and then reverts to high level at a point $P_3$ following the end of the pulse signal M(28). On the other hand, if a reverse mode is selected, the signal RD goes from a low value to a high value at the point $P_2$ and then reverts to a low value at the point $P_3$. Thus, when the tape is run intermittently in the forward direction, the rotation direction switching signal RD becomes high when the motor 1 is to be driven to advance the tape, and low when the motor is to be braked. When the tape is run intermittently in a reverse direction, the switching signal RD becomes low when the motor 1 is to be driven in the reverse direction, and high when the motor is to be braked.

In the previously-described control circuit (FIG. 1) for the DC motor 1, the control signals CTL reproduced from the tape are used as a reference to control the stop position of the tape, with the stopping being delayed by a predetermined amount of time to generate the brake pulse M(9) having a predetermined width $T_r$. Tracking adjustment is achieved by controlling the delay time of the pulse signal M(8).

However, if this technique is used to generate a brake signal, any drop-out occurring in the reproduced control signal CTL will result in the tape not being stopped until the next control signal CTL is picked up. Consequently, mistracking can occur. Further, because the brake pulse M(9) cannot be generated prior to the time that the reproduced control signal CTL is picked up, if the desired stop position for the tape is near a recorded position of the control signals CTL on the tape, the actual stopping position of the tape will be somewhat beyond the desired position, also resulting in mistracking.

Figure 5:
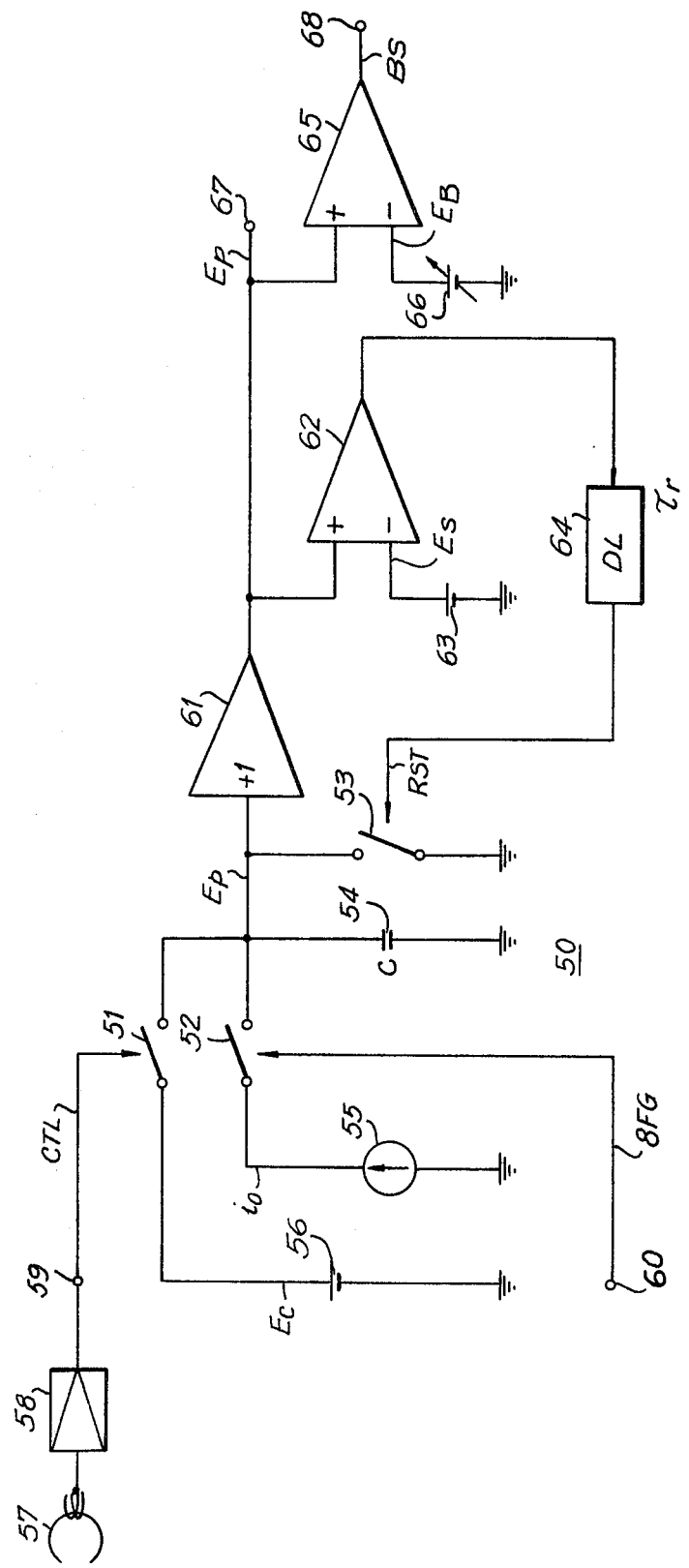
FIG. 5 is a schematic circuit diagram of a brake start signal generating circuit according to one embodiment of this invention.

Accordingly, in order to avoid the above drawbacks, the brake start signal BS used in the control circuit of FIG. 3 can be generated in the circuit of this invention, a first embodiment of which is illustrated in FIG. 5.

In the brake start generating circuit of FIG. 5, a sample-hold circuit 50 is formed of a controlled switch 51, another control switch 52, and a reset switch 53 coupled to a charging terminal of a hold capacitor 54 having a hold capacitance C. This capacitor has one grounded terminal and another terminal serving as a charging terminal. A constant current source 55 is joined to the charging terminal of the capacitor 54 by the controlled switch 52 to provide a constant current $i_0$ to the capacitor 54 whenever the switch 52 is closed. A reference voltage source 56 provides a voltage clamping level $E_C$ to the capacitor 54 whenever the switch 51 is closed. The reset switch 53 bridges the capacitor 54, and discharges it to ground level whenever the switch 53 is closed.

A control signal pick-up head 57 is disposed in proximity to a control track on tape to pick up the control signal CTL as the tape is drawn past it. This control signal CTL is amplified in an amplifier 58 and is thence furnished to an input 59, where it is used to control the actuation of the switch 51.

Another input 60, coupled to the frequency multiplier 23 of FIG. 3, receives the frequency signal 8FG and uses the same to actuate the switch 52. The hold capacitor 54 acts as an integrator to accumulate electrical charge each time the switch 52 is closed, so that, at the charging terminal of the capacitor 54, a position value $E_P$ appears, which, as shown in FIG. 6A, gradually increases from a zero level to a maximum level $E_S$.

As shown in FIG. 6B, the range zero to $E_S$ of the position value $E_P$ is selected to correspond to a predetermined number N of occurrences of the frequency signal 8FG. For each such occurrence of this frequency signal 8FG, the constant current $i_0$ is supplied to the capacitor 54 for a time $T_c$ corresponding to the pulse width of the frequency signal 8FG. Consequently, the position value $E_P$ increases by step increments $\Delta E_P$, as shown in the detail circle of FIG. 6A, each occurrence of the frequency signal 8FG. This increment $\Delta E_P$ corresponds to a value $i_0 t_c / C$.

As shown in FIGS. 6C, each time the control signal CTL is detected, and the switch 51 is closed, the position value $E_P$ is clamped to the voltage clamp level $E_C$. This accomodates any inaccuracies due to changes in the running speed, tape slippage, or other variations.

As mentioned previously, the parameters of the circuit of FIG. 5 should be selected so that N pulses of the frequency signal 8FG are generated when the capstan moves the tape a distance corresponding to the pitch of the control signal CTL, that is, a distance corresponding to the physical separation of occurrences of the recorded control signal CTL, which in turn corresponds to the period of the control signal CTL. That is, the constant current $i_0$ should be selected to satisfy the relationship $$E_S = N \Delta E_P = N i_0 T_c / C.$$

After N occurrences of the frequency signal 8FG, the position value $E_P$ will reach the maximum value $E_S$ of its range, and should therefore be reset to the zero end thereof. For this purpose, following an isolation amplifier 61, a comparator 62 has a (+) input coupled to receive the position value $E_P$ and a (−) input connected to a source 63 providing a reference voltage corresponding to the maximum value $E_S$ of the position value $E_P$. If this value $E_S$ is selected to satisfy the relationship $$(N-1) \cdot E_P < E_S < N \cdot E_P,$$

a signal is provided from an output of the comparator 62 after N occurrences of the frequency signal 8FG. This signal is applied to a delay circuit 64 of a delay time $\tau_r$ which provides a reset pulse RST (FIG. 6D) to close the switch 53. This delay time $\tau_r$ is selected to be less than the period of the frequency signals 8FG when the tape device is operated at normal speed. This reset pulse RST acts to reset the position value $E_P$ to zero or ground each N occurrences of the frequency signal 8FG, corresponding to movement of the tape by one pitch of the control signal CTL.

The clamping operation, which is carried out upon detection of the control signal CTL, closes the switch 51 for a period which is shorter than the normal-running-speed period $\tau_0$ of the frequency signals 8FG, thereby setting the position value $E_P$ to the voltage clamp level $E_C$. The latter is selected to be less than the reference voltage level $E_S$.

The position value $E_P$, obtained as described hereinabove and as shown generally in FIG. 6A, is applied to a comparator 65 to derive the brake start signal BS, as shown in FIG. 6E. This signal BS is applied to the circuit of FIG. 3 to halt the tape, whose running speed is shown in FIG. 6F, to stop the tape from a normal speed NS.

The comparator 65 has a (−) input coupled to an adjustable voltage source 66, which supplies thereto a brake threshold voltage $E_B$, here selected to be less than the voltage clamp level $E_C$, and a (+) input coupled to receive the position value $E_P$. The latter is also applied to an output terminal 67. The comparator 65 has an output connected to another output terminal 68 to provide thereto the brake start signal BS as shown in FIG. 6E. The leading edge of the signal BS corresponds to the point at which the position value $E_P$ equals the brake threshold voltage $E_B$. In this case, the tape continues to move after the brake start signal BS commences, and then stops a short distance thereafter, and the capacitor 54 continues to charge incrementally until the tape stopping point is reached. As a result, the position of the stopping point corresponds to a position value $E_P$ that is a voltage $\Delta E_B$ above the threshold voltage $E_B$. Thus, with this embodiment, tracking control is carried out by selecting the threshold voltage $E_B$.

Experiments have shown that the ratio of slip between the capstan and tape is nearly 0.1 percent. However, because of the clamping of the position value $E_P$ to the voltage clamp level $E_C$, any error caused by tape slippage is not accumulated. Thus, even if the control signal CTL cannot be reproduced for a successive twenty to thirty pitches, or corresponding periods, of the control signal CTL, the amount of error occurring in the position signal $E_P$ amounts to no more than approximately one step $\Delta E_P$. The frequency of the frequency signal 8FG is relatively large compared to the frequency of the control signal CTL, favorably at least about eighteen times the frequency of the control signal CTL.

Preferably, the voltage clamp level $E_C$ should have a value $n \cdot \Delta E_P$, where n is an integer less than N. Nevertheless, if N is sufficiently large, so that any error occurring within one step of the waveform of FIG. 6A is insignificant, this rule does not need to be strictly obeyed, and the arrangement of the circuit of FIG. 5 is made more simple.

Further, because the tracking of the tape is carried out by the selecting the relationship of the value of the voltage clamp level $E_C$, to that of the variable brake threshold voltage $E_B$, this circuit could also be constructed to operate to the same effect if the voltage source 66 (i.e., the brake threshold level $E_B$) were fixed and the voltage source 56 (i.e., the clamp level $E_C$) were variable.

Figure 5A:
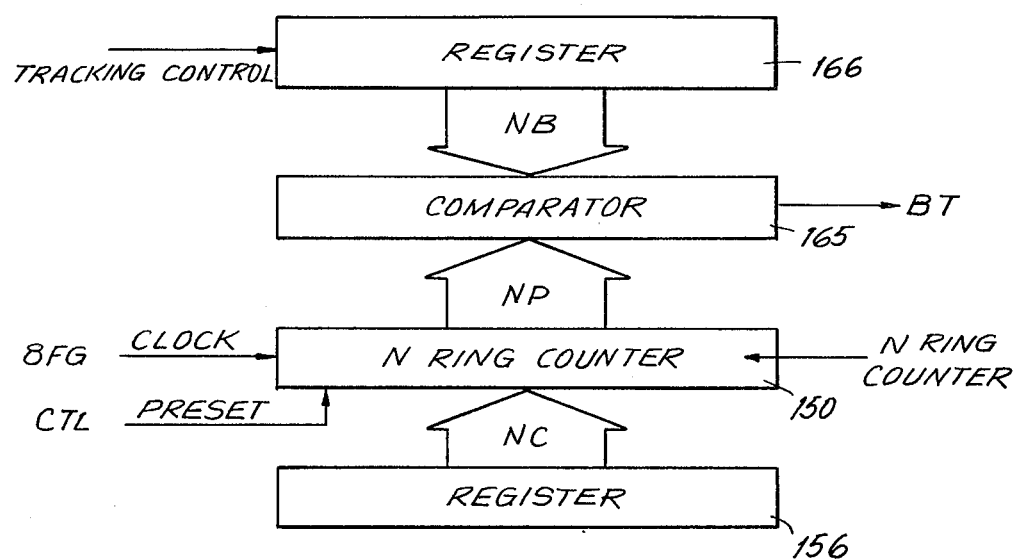
FIG. 5A is a schematic representation of another embodiment of this invention, employing digital techniques.

FIG. 5A shows an alternative arrangement of this embodiment, in which tracking control is carried out using digital techniques. Here, an N-bit ring counter 150 has a clock terminal receiving the frequency signal 8FG and a preset terminal receiving the control pulse signal CTL. A position count $N_P$ increments by unity each occurrence of the frequency signal 8FG, and resets to zero when the position count $N_P$ reaches an upper end of its range (i.e., a count of N.)

A preset register 156 stores a preset count $N_C$ which is used to adjust the count $N_P$ stored in the counter 150 when the control signal CTL occurs. A digital comparator 165 receives the position count $N_P$ from the counter 150 and also receives a threshold count $N_B$ stored in a tracking control register 166. This count $N_B$ is selected, for example, to correspond to the distance between a predetermined position of the control pulse CTL and the position of a recorded video track. The comparator 165 provides a brake start signal BT whenever the position count $N_P$ equals or exceeds the threshold count $N_B$.

The circuits shown in FIGS. 5 and 5A provide accurate tracking during slow motion reproduction whenever the tape is driven in the forward direction. However, if these circuits are used without further modification, some problems can occur if slow motion reproduction is carried out with the tape driven in the reverse direction.

As shown in FIG. 7, the desired stopping positions $S_1$ and $S_2$ of a magnetic tape TP can be considered as being displaced by a predetermined amount $\Delta S$ from positions CTLP of the recorded control signal CTL. If the tape is advanced from the position $S_1$ to the position $S_2$ (i.e., in the forward direction) the position $S_2$ will occur at the predetermined distance $\Delta S$ after the control pulse position CTLP is reached. However, if the tape is moved from the position $S_2$ reversely to the position $S_1$, the latter position $S_1$ will be reached a distance $\Delta S$ prior to the associated control pulse position CTLP. Consequently, if the brake start signal BS is provided to stop the movement of the tape TP at a position $\Delta S$ after the control pulse CTLP, when the tape is moved in the reverse direction, the tape TP will be stopped at a distance $2\Delta S$ away from the desired position $S_1$.

If the tape TP is video tape used in a two-hour mode, this distance $\Delta S$ corresponds to a distance S/4, where S is one pitch of the control signal CTL. If the tape TP is used in a three-hour mode, this distance $\Delta S$ will be approximately S/10.

In other words, when the tape is moved in the reverse direction, as shown in a solid line in FIG. 8, and a clamp operation is carried out at the voltage clamp level $E_C$ upon occurrence of the control signal CTL (FIG. 8B). As a result, the tape TP continues moving well beyond the desired stopping position. The same result occurs if the control signals are provided as prerecorded signals CTL' (FIG. 8C) on interchangeable tape. However, if the clamp level $E_C$ is changed from the forward-direction clamping level to another clamp level $\overline{E_C}$, as indicated by the hollow circle on FIG. 8A, the tracking will occur correctly, as indicated by the dash line in FIG. 8A. In this case, the clamp levels $E_C$ and $\overline{E_C}$ are symmetric about a stopping voltage $E_0$. In this case, $E_0$ generally satisfies the relationship $$E_0 = E_B + \Delta E_B,$$

and thus corresponds to the actual value of the position signal $E_p$ when the tape TP has been stopped. This stopping value $E_0$ can also be expressed $$E_0 = \tfrac{1}{2}(E_C + \overline{E_C})$$

Thus, it should be apparent that correct tracking can be carried out by using the clamp level $E_C$ in forward operation, and the clamp level $\overline{E_C}$ reverse operation. It is not necessary to change the threshold voltage $E_B$.

Figure 9:
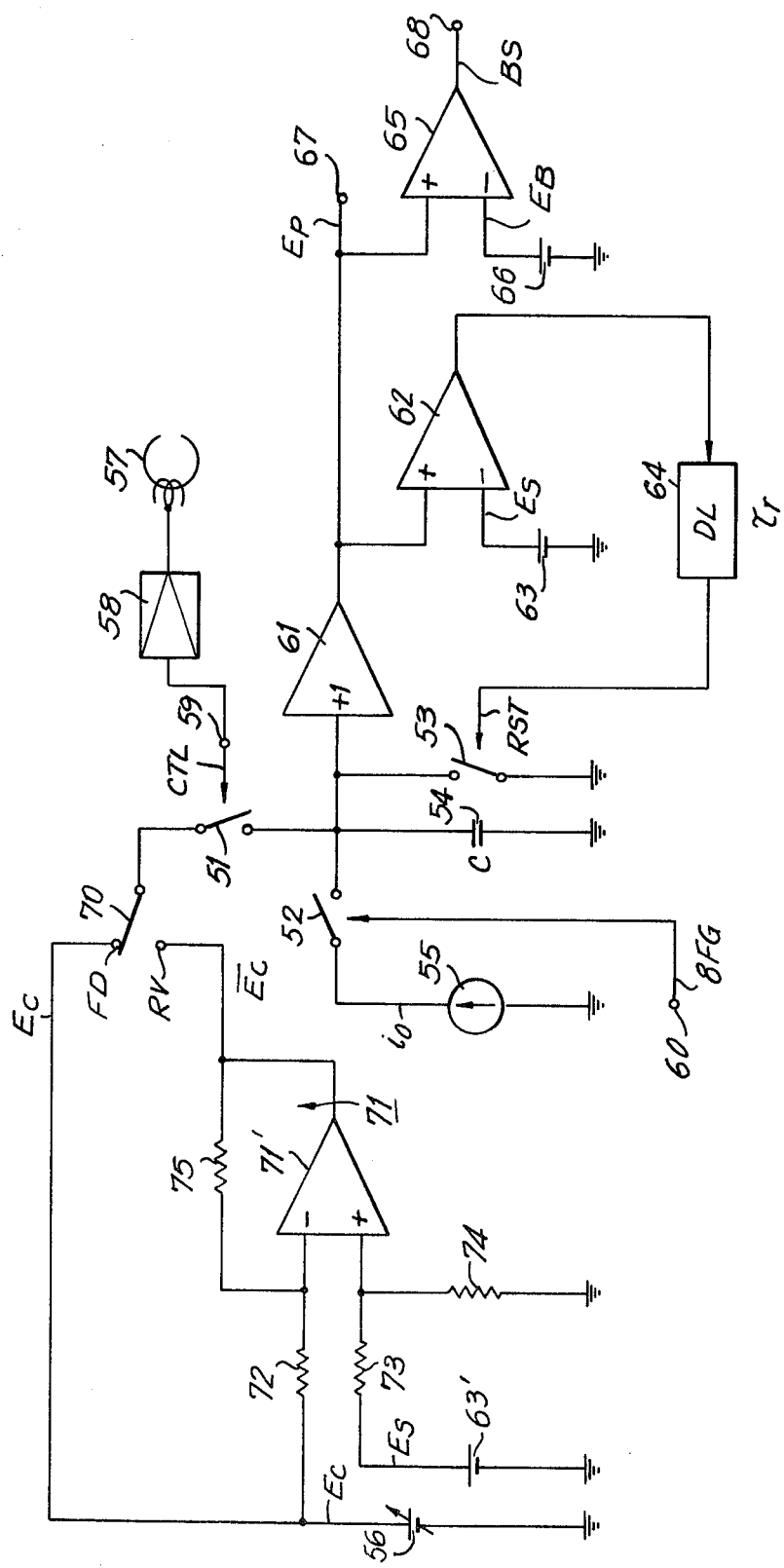
FIG. 9 is a schematic diagram of another embodiment of this invention.

FIG. 9 illustrates another embodiment of this invention, which provides the brake start signal BS to achieve accurate tracking in both the forward and reverse directions. Elements of this embodiment which also appear in the embodiment of FIG. 5 are identified with the same reference characters, and a detailed description thereof is omitted.

In this embodiment, circuitry is provided in advance of the controlled switch 51 to provide a first clamp level $E_C$ when the tape is advanced in the forward direction, and another clamp level $\overline{E_C}$ when the tape is advanced in the reverse direction. In this circuitry, a switch 70 has an output connected to the controlled switch 51, one switched terminal FD connected to the source 56 of the voltage clamp level $E_C$, and another switched terminal RV. The switch 70 is disposed to connect the terminal FD when the tape device is set into its forward mode, and to connect the terminal RV when the tape device is set into its reverse mode.

Operational amplifier 71' is connected as an inverter or subtractor 71, having biasing resistors 72, 73, 74 and 75 coupled thereto, each of a value R. The resistor 72 joins the source 56 to a (−) input of the operational amplifier 71', and the resistor 75 connects an output thereof back to the (−) input. The resistor 73 connects a (+) input of the operational amplifier 71' to a voltage source 63' providing the maximum level voltage $E_S$ thereto. The resistor 74 is connected between the (+) input and ground.

The maximum level voltage $E_S$ provided from the source 63' is, of course, the same level $E_S$ that is supplied from the source 63 to the operational amplifier 62.

The output of the operational amplifier 71', i.e., the output of the inverter 71, is connected to the terminal RV to supply the voltage clamp level $\overline{E_C}$ to clamp the capacitor 54 when the tape is being run in the reverse direction. This clamp level $\overline{E_C}$ equals the difference between the maximum level $E_S$ and the clamp level $E_C$.

As shown in FIG. 10A, if the brake threshold voltage $E_B$ has a fixed value $$E_B = E_S/2 - \Delta E_B$$

the stopping voltage $E_0$ will be approximately half the maximum voltage level $E_S$. Consequently, tracking adjustment is carried out by changing the clamp voltage $E_C$ by use of the switch 70. It should be appreciated that the clamp level $E_C$ and the clamp level $\overline{E_C}$ have symmetric values about the stopping voltage $E_0$. Thus, the stopping voltage $E_0$ has the relationship $$E_0 = \tfrac{1}{2} E_S.$$

As a result of the selection of the clamp levels $E_C$ and $\overline{E_C}$, the position value $E_P$ will be clamped at the appropriate one of these values $E_C$ and $\overline{E_C}$ at the time of occurrence of the control signals CTL (FIG. 10B) in both the forward and the reverse direction, with the result that the tape TP is stopped substantially at a position in which the position value $E_P$ equals the stopping voltage $E_0$.

FIGS. 11 and 12 illustrate the tracking range achieved using the embodiment of FIG. 9. As shown in FIG. 11, if the clamp levels $E_C$ and $\overline{E_C}$ can be selected within the range of zero to $E_S$. The clamp levels $E_C$ and $\overline{E_C}$ can be set anywhere within a range corresponding to one pitch of the control signal positions CTLP. However, as shown in FIG. 12, the optimum stopping positions, as shown by a dotted line, are disposed a small distance $\Delta S$ from the control pulse positions CTLP. Consequently, the real tracking range is somewhat asymmetric about the control pulse positions CTLP, extending in the reverse direction a distance $S/2 + \Delta S$ and in the forward direction a distance $S/2 - \Delta S$. Therefore, the center of the adjustable level $E_C$ used for tracking control is offset by an amount corresponding to $-\Delta E_S$ from the actual midpoint of the variable range $E_S/2$.

Figure 13:
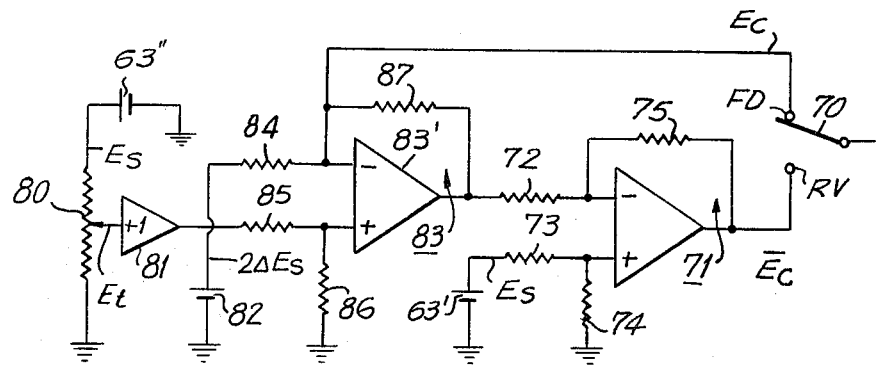
FIG. 13 is a schematic diagram of a portion of another embodiment of this invention.

FIG. 13 shows another embodiment of the circuit of this invention, in which elements shared with the previously-described embodiments of FIGS. 5 and 9 are identified with the same reference numbers, and a detailed description thereof is omitted.

In FIG. 13, a variable resistor 80, having a detent or click-stop provided to hold its slider at a midpoint of its range, is used as a voltage divider and is coupled between a source 63'' and ground. The source 63'' provides the maximum voltage level $E_S$. An adjustable voltage $E_t$ appears at the slider of the variable resistor 80, and is furnished through an isolation amplifier 81 to a subtractor 83. Here, another source 82 provides a voltage level $2\Delta E_s$. The subtractor 83 includes an operational amplifier 83', biasing resistors 84, 85, 86, and a feedback resistor 87. The resistors 84–86 have the same value R as the resistor 72–75, but the feedback resistor 87 has a different value R'. In this embodiment, the value R' of this resistor 87 is selected to satisfy the relationship $$R'/R = 1 - 2(\Delta E_S/E_S)$$

The resistors 84 and 85 join the source 82 and the amplifier 81 to (−) and (+) inputs, respectively, of the operational amplifier 83. The resistor 86 bridges between the (+) terminal and ground, and the feedback resistor 87 extends from the output of the operational amplifier 83' to its (−) input. The output of the operational amplifier 83' is also connected to the terminal FD of the switch 70 to supply the clamp level $E_C$ thereto.

The subtractor 83 subtracts the level $2\Delta E_s$ from the level $E_t$ to provide the clamp level $E_C$, which is then fed to the subtractor 71, from which the clamp level $E_C$ is derived.

Figure 14:
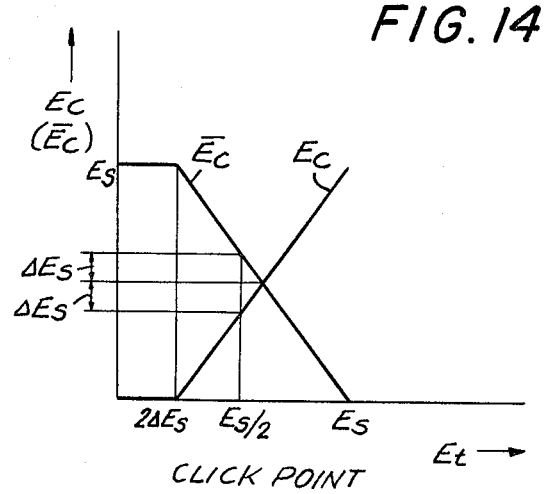
FIG. 14 is a chart showing the tracking range of the embodiment of FIG. 13.

The characteristics of the clamp levels $\overline{E_C}$ and $E_C$ with respect to the tracking control voltage $E_t$ are shown in FIG. 14. These values can be adjusted, by moving the slider of the variable resistor 80 from its click point, anywhere within a range of $2\Delta E_S$ to $E_S$.

It should be appreciated that, with the circuits embodying this invention, a control circuit, such as that shown in FIG. 3, can operate a capstan motor intermittently to effect accurate stopping of the tape at any point within its range, up to ± one-half times the pitch of the control signal CTL. Accordingly, the tape can be stopped at any arbitrary desired stopping position, and this stopping position can be achieved with high accuracy.

Although this invention has been explained in the context of a video tape device, the invention can be practiced in a wide variety of environments where it is desired that a web be driven intermittently, and stopped at a desired position.

Also, the embodiments of FIGS. 9 and 13 can be constructed using digital, rather than linear, circuitry, for example, providing means for adjusting the count $N_C$ in the storage register 165 to a different preset clamping value when a reverse tape mode is selected.

Moreover, while several preferred embodiments have been described hereinabove, many modifications and variations thereof will become apparent to those of ordinary skill in the art, without departure from the scope and spirit of this invention, as defined in the appended claims.

What is claimed is:

1. A control circuit for a DC motor in a device arrangement for driving a web having control signals recorded thereon to indicate predetermined positions of the web, comprising frequency generator means associated with said DC motor for generating a frequency signal having a frequency that varies with angular speed of said motor; position signal generating means supplied with said frequency signal for generating a position value that varies step by step with occurrences of said frequency signal to indicate the position of said web relative to said predetermined positions; control signal pickup means for reproducing said control signals from said web when said web is moved therepast; control means for adjusting said position value upon detection of said control signals; brake start signal generating means for generating a brake start signal when said position value reaches a predetermined value; and drive control means responsive to said brake start signal to halt said DC motor at a position corresponding to one of said predetermined positions of said web.

2. A control circuit according to claim 1, wherein the frequency of said frequency signal is greater than the frequency of said control signals when said web is being driven.

3. A control circuit according to claim 2, wherein the frequency of said frequency signal is at least approximately 18 times the frequency of the control signals.

4. A control circuit according to claim 1, wherein said control means includes means for setting the position value to a predetermined clamp value upon occurrence of said control signals.

5. A control circuit according to claim 1, wherein said position signal generating means includes reset means for resetting said position value to a beginning value when said position value reaches a predetermined reference value.

6. A control circuit according to claim 1, wherein said position signal generating means includes a capacitor, current source means providing a constant current, and first switch means actuated by said frequency signal for coupling said current source to said capacitor and incrementally charging the same upon occurrences of said frequency signal.

7. A control circuit according to claim 6, wherein said control means for adjusting said position value includes a clamping voltage source providing a voltage clamping level and second switch means actuated upon detection of said control signals to set said position value at said voltage clamping level.

8. A control circuit according to claim 6, further comprising a reference voltage source providing a reference voltage value, a comparator comparing said position value with said reference voltage value, and having an output providing an output signal when said position value attains said reference voltage value, and reset switch means for resetting said capacitor to a reset level in response to the output signal from said comparator.

9. A control circuit according to claim 8, wherein said reset switch means includes a reset switch in parallel with said capacitor, and a delay, having a predetermined delay time, disposed between the output of said comparator and said reset switch.

10. A control circuit according to claim 1, wherein said brake start signal generating means includes a comparator having one input coupled to receive said position value, another input, and an output providing said brake start signal, and a voltage reference source coupled to the said another input of said comparator.

11. A control circuit according to claim 10, wherein said voltage reference source is adjustable to select the web position, relative to the positions of the recorded control signals, at which said brake start signal commences.

12. A control circuit according to claim 1, wherein said position signal generating means includes an N-bit ring counter having a clock input to receive said frequency signal and a preset input coupled to receive a signal generated upon detection of said control signals; said control means for adjusting the position value includes a preset register supplying a preset count value $N_C$ to said N-bit ring counter; and said brake start signal generating means includes a digital comparator providing said brake start signal when said N-bit ring counter attains a predetermined count value $N_B$.

13. A control circuit according to claim 1, wherein said brake start signal generating means further includes a tracking register coupled to said comparator to provide said predetermined count value thereto.

14. A control circuit for a DC motor in a drive arrangement for forward and reverse driving of a web having reproducible control signals thereon to indicate predetermined positions of the web, comprising frequency generator means associated with said DC motor for generating a frequency signal having a frequency that varies with angular speed of the motor regardless whether said web is driven forwardly or reversely; position signal generating means supplied with said frequency signal for generating a position value that varies step by step with occurrences of said frequency signal to indicate the position of said web relative to said predetermined positions; control signal pickup means for reproducing said control signals from said web when said web is moved therepast; first control means for adjusting said position value to a first predetermined value, while said web is driven forwardly, upon detection of said control signals; second control means for adjusting said position value, to a second predetermined value, while said web is driven reversely, upon detection of said control signals; brake start signal generating means for generating a brake start signal when said position value attains a brake start reference value; and drive control means responsive to said brake start signal to halt said DC motor at a position associated with one of said predetermined positions of said web.

15. A control circuit according to claim 14, wherein said first control means includes a source providing said first reference value, and coupling means actuated upon detection of said reference signals to set said position signal generating means to said first reference value; and said second control means includes subtractor means provided with said first reference value and another predetermined value, and having an output providing as a second reference value the difference between said another predetermined value and said first reference value, and said coupling means to set said position generating means to said second reference value.

16. A control circuit according to claim 15, further comprising selecting means for connecting said source to said coupling means when one of a forward and a reverse mode for said drive arrangement is selected, and for connecting the output of said subtractor means to said coupling means when the other of said forward and said reverse mode is selected.

17. A control circuit according to claim 15, wherein said another predetermined value corresponds to a maximum value of said position value.

18. A control circuit according to claim 15, wherein said source includes value selector means providing an adjustable value in a range between a predetermined minimum value and said another predetermined value; and subtractor means subtracting a predetermined reference value from said adjustable value and having an output providing said first reference value.

19. A control circuit according to claim 18, wherein said value selector means includes a voltage divider formed of a voltage source and a variable resistor having a slider with a click-stop at a central setting thereof, said slider being coupled to said subtractor to provide said adjustable value thereto.

20. A control circuit according to claim 14, wherein said first and second predetermined values are selected to be substantially equally disposed above and below a value halfway between minimum and maximum values of said position value.

* * * * *